June 6, 1967 W. S. EGGERT, JR 3,323,608
LIGHT WEIGHT UTILITY VEHICLE
Filed Aug. 31, 1965 2 Sheets-Sheet 1
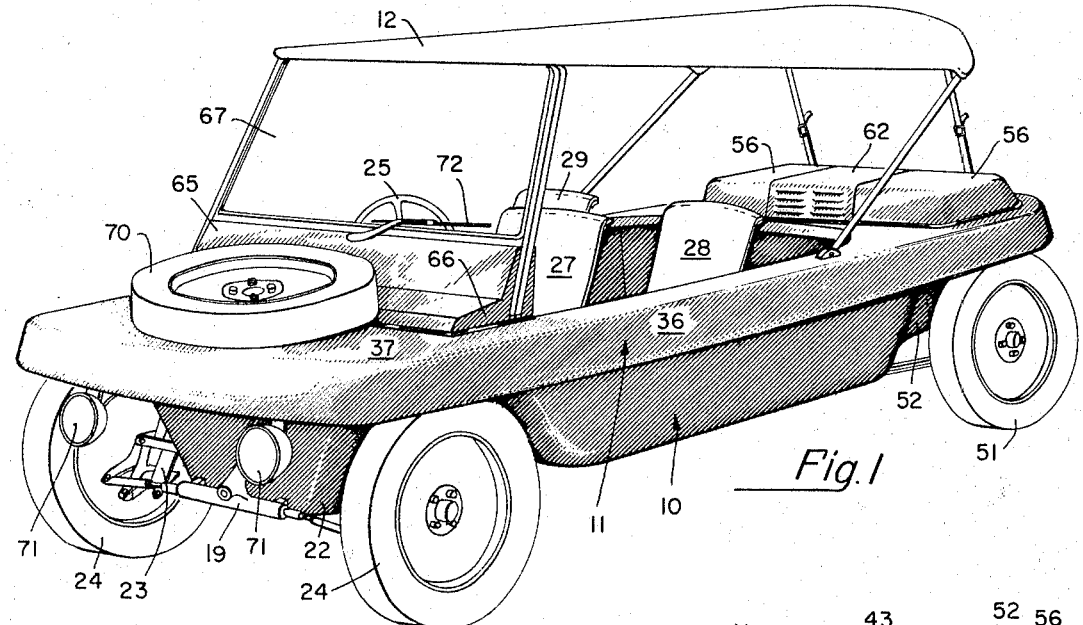
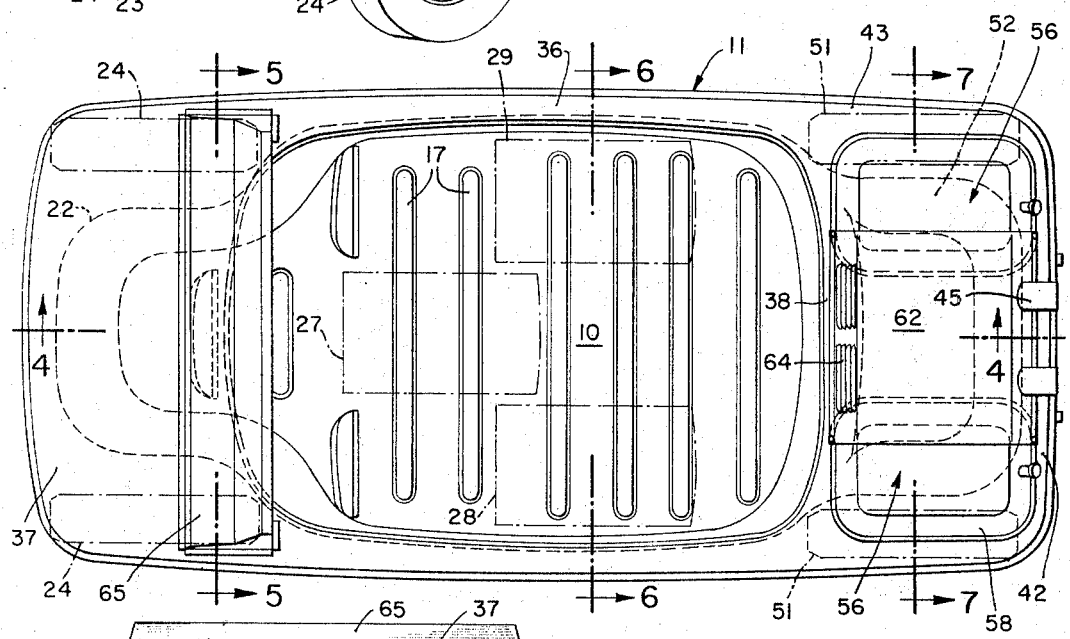
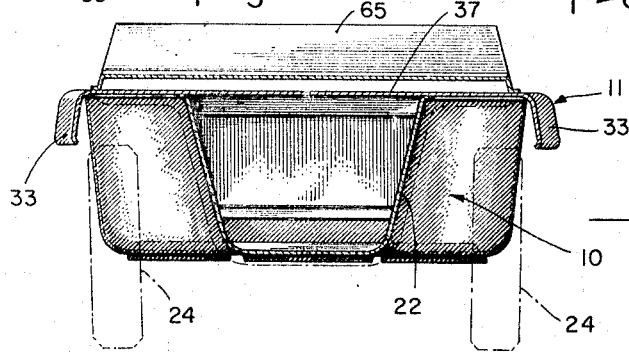
INVENTOR.
WALTER S. EGGERT, JR.
BY
John B. Sowell
ATTORNEY June 6, 1967  W. S. EGGERT, JR  3,323,608
LIGHT WEIGHT UTILITY VEHICLE
Filed Aug. 31, 1965  2 Sheets-Sheet 2
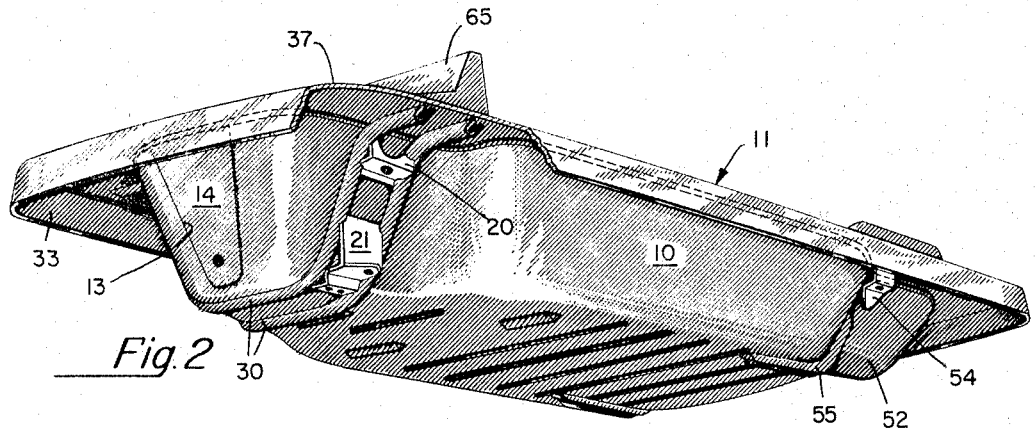
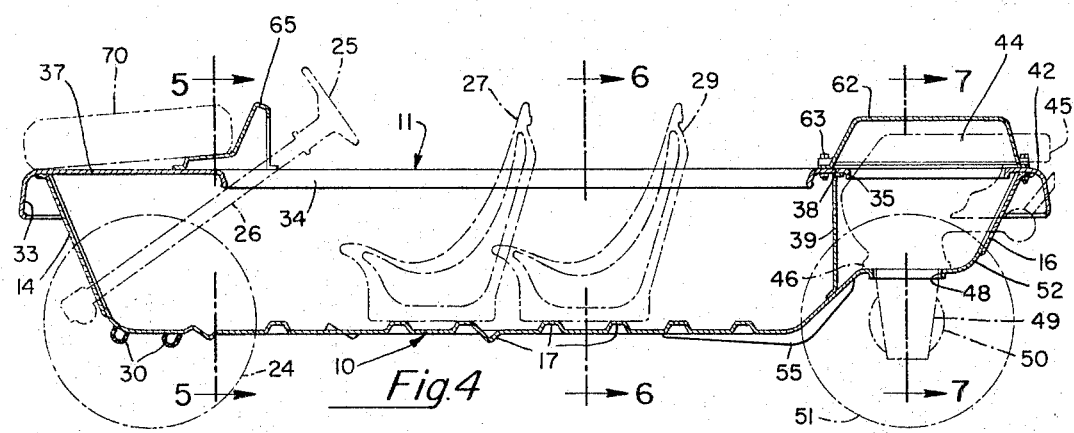
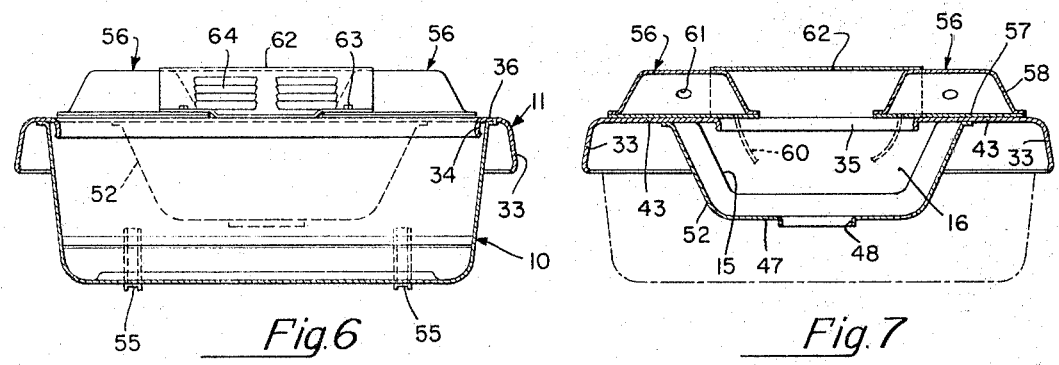
INVENTOR.
WALTER S. EGGERT, JR.
BY John B. Sowell
ATTORNEY

United States Patent Office 3,323,608
Patented June 6, 1967

3,323,608
LIGHT WEIGHT UTILITY VEHICLE
Walter S. Eggert, Jr., Philadelphia, Pa., assignor to The Budd Company, Philadelphia, Pa., a corporation of Pennsylvania
Filed Aug. 31, 1965, Ser. No. 483,928
15 Claims. (Cl. 180—54)

This invention relates to a light weight utility vehicle and has for an object the provision of improvements in this art.

One of the particular objects of the invention is to produce an automotive vehicle which is suitable for general purpose uses and capable of travelling both on highways and on cross-country terrain, including cross-water travel.

Another object is to provide a vehicle which is very light in weight so that it can be lifted or pulled from difficult positions by the number of occupants who can ride in it, if they are able-bodied men, as would be expected in most cases for its intended uses.

Another object is to provide a vehicle which is simple and inexpensive to build, operate, maintain and repair.

Another object is to provide a vehicle which has ample passenger and luggage space and which has an attractive appearance.

Another object is to provide a vehicle which employs suspension, steering, and power drive units which are readily obtainable as standard items on the market.

Another object is to provide a vehicle which is low in height so that it is easy for passengers to enter and leave without requiring doors.

Another object is to provide a vehicle with the motor mounted on the rear end to minimize drive connections and to obtain maximum traction.

The above and other objects of the invention, as well as various novel features and advantages, will be apparent from the following description of an exemplary embodiment, reference being made to the accompanying drawings, wherein:

FIG. 1 is a front-side-top perspective view of an automotive vehicle embodying the present invention;

FIG. 2 is a front-side-bottom perspective view of the body alone, parts being broken away in places;

FIG. 3 is a top plan view of the body without the top and with the running gear shown in broken lines;

FIG. 4 is a central vertical longitudinal section taken on the line 4—4 of FIG. 3, and showing the power plant, running gear, and steering mechanism in broken lines;

FIG. 5 is a vertical transverse section taken on the line 5—5 of FIG. 3;

FIG. 6 is a vertical transverse section taken on the line 6—6 of FIG. 3;

FIG. 7 is a vertical transverse section taken on the line 7—7 of FIG. 3.

The improved and important feature of the vehicle is the body. This is a rigid unitized structure comprising a tub-like lower portion or body proper, designated by the numeral 10, and an upper frame or chassis-like portion, designated by the numeral 11. In a sense, the body is built upside-down, with the chassis above instead of below the body proper, although the chassis here does not carry the supports, running gear and the like, as in conventional vehicles. There are no doors. Both the upper and lower portions of the body being circumferentially continuous on the sides; and the top of the frame portion 11 is disposed at so low an elevation that it is easy to step into and out of the vehicle. Specifically, the top of the frame or deck may be about 30" above the ground. The total length of the vhicle may be about 123", the suspension length between wheel axles about 90", the overall width about 58", the wheel base about 45" front and 47" rear, and the total weight without load less than 800 pounds. When a top 12 is provided (a foldable, removable top being shown) the total height may be about 60".

The body portion 10 may be formed essentially as a single stamping, but because the deep drawing needed would be troublesome, the body is formed with a front end gap 13 which is filled by a welded-in plate 14 (FIGS. 2 and 4), and a rear-end gap 15, which is filled with a welded-in plate 16 (FIGS. 4 and 7). The floor of the body, as shown in FIGS. 3 and 5, may be formed with integral press-formed stiffening ribs 17, here shown to extend transversely although longitudinal stiffening elements may be provided if desired.

The body is wide in the mid-portion to accommodate passengers and luggage and narrow at the ends to accommodate the wheels outside the body proper and inside the overall width of the body. The top frame 11 in plan is generally rectangular with rounded corners and with an outward curve or bulge in the middle. The wheels are disposed wholly beneath the body frame at the four corners.

Welded-on brackets 20 and 21 are provided on the narrow front end portion 22 of the body (FIG. 2) to carry supporting mechanism 23 for the front wheels 24. The wheels are steered by suitable linkage 19 from a steering wheel 25, the shaft of which is carried by a column 26 sealingly mounted on the front end panel of the body. The steering wheel is located centrally of the body and the narrow front end portion 22 of the body provides ample foot and leg space for a driver occupying a front center seat 27. Passenger seats 28 and 29 are provided at the sides and to the rear of the driver's seat. There may be a fourth seat (not shown) behind the driver's seat if the space is not used for luggage or movement of passengers.

The front end portion 22 of the body is rigidified and strengthened in the region of the brackets 20, 21 by form-fitting transverse inverted channel ribs 30 which are welded to the body. The ends of the ribs 30 extend beneath and are welded to the frame 11, as best shown in FIG. 2.

The top frame member 11 is formed as an inverted channel-shaped ring with a wide outer encircling flange 33, a front inner circumferential flange 34 surrounding a large front opening for the passenger space, and a rear inner circumferential flange 35 surrounding a rear opening for the power plant or engine space.

The longitudinal side panels 36 of the frame 11 along the passenger space of the vehicle between the very deep outer flange 33 and the inner flange 34 are quite wide to provide, when welded to the deep circumferentially-continuous side walls of the body, a very rigid beam-like structure; the front panel 37 of the frame between the deep outer flange 33 and the inner flange 34 is very wide to provide a front hood-cowl and, when welded to the deep side walls of the body, to form a box-like structure of great rigidity and strength; the intermediate transverse panel 38 of the frame between the front inner flange 34 and the rear inner flange 35 is relatively wide and, when to this is welded a transverse vertical plate bulkhead 39 which is also welded to the bottom and sides of the body portion 10, there is provided a very strong, rigid, box-like structure at the forward side of the engine compartment; the rear transverse panel 42 of the frame between the outer deep flange 33 and the rear inner flange 35 is relatively wide and, when welded to the deep rear end wall of the body, provides a rigid box-like structure; and the rear side panels 43 of the frame between the deep outer flange 33 and the rear inner flange 35 are very wide and, when welded intermediate their width to the rear side walls of the body, aid the surrounding structure in providing a very strong, rigid, box-like structure.

A power plant or engine 44 is indicated in broken lines in FIG. 4, the engine having projections 45 resting on the rear panel 42 and a flange 46 resting on the elevated floor 47 of the narrow rear portion 52 of the body around a flanged opening 48. A transmission-differential mechanism 49, the rear drive mechanism 50, and wheels 51 are secured to the rear portion of the body.

Brackets 54 are secured beneath the sides of the frame and to the sides of the body to carry shock struts of the rear axles; and reinforcing strip brackets 55 are provided beneath the rear deep portion of the body to carry axle-attached leaf springs and take longitudinal loads imposed by driving and braking.

The sides at the rear are provided with rigidifying and strengthening box-like structures 56, each comprising a bottom plate 57 and an inverted box member 58, the parts being welded together and welded to the top panels 43 of the frame. The boxes extend inward beyond the inner edges of the panels 43 and are provided with drain means 60. The upper box part is provided with a vent opening 61 in the rear side. It is to be noted that the boxes are located at the points where the vertical loads imposed by the rear wheels are concentrated.

The space left between the inner sides of the boxes 56 is adequate for the insertion and removal of the engine 44 and the engine is covered and the box-like structure further rigidified and strengthened by a channel-shaped cover 62 which is removably secured, as by screws 63 to the adjacent parts. The front flange of the cover is provided with louvered air openings 64.

The engine is preferably of the air-cooled type, similar to motorcycle engines, and, in the small size needed to provide road speeds of 50 miles per hour or more for this light vehicle, will not require battery starting mechanism, the recoil pull-rope starting means usual for small motors being adequate.

At the front a transverse inverted channel-shaped frame member 65, with end closures 66, is provided to support a windshield 67 and instrument panel, the member 66, 65 being secured, as by welding, to the rear edge of the very wide front panel 37 to further strengthen and rigidify the front box-like structure.

A spare tire 70 may conveniently be carried on the top of the hood-cowl panel 37.

Headlights 71 and a windshield wiper 72 are provided.

The body 10 may be formed from 0.040 body steel and, since the top frame 11 is the main strength member, it is preferably formed from a heavier gage metal, such as 0.060 body steel.

The frame may be formed by blanking and drawing, trimming by a rotary shear, and provided with a return flange on all free edges by a curling die.

It is to be noted that the engine is mounted in a completely separated water-tight compartment or plenum and that all air is drawn from within the passenger compartment enclosure, which provides considerable protection of the engine from rain and dust, particularly when the passenger compartment is enclosed by the top and side curtains. Hot air and exhaust gases pass out at the rear end.

Little metal is lost in making the vehicle because most of the brackets, boxes and other supplementary parts can conveniently be made from metal cut out of a sheet to form the openings of the top frame.

While the vehicle is designed to travel on water, it is not primarily designed for such use, hence no means for water propulsion are shown. For such travel, oars or paddles may be provided. The top frame is very strong and it would be relatively easy to provide a mounting for an outboard motor on the rear end.

Another use for which this vehicle is well adapted to serve is as a motorized golf vehicle, very large size tires being used in this case, as it usual.

It is thus seen that the invention provides a very light, rugged, durable, and inexpensive automotive vehicle which can maintain acceptable speeds on public highways; which can travel over rough terrain where roads are bad or where there are no roads at all; and which can travel on water when required. The body is very simple and easily fabricated and designed to concentrate strength and rigidity at the points where most needed and most effective.

While one embodiment of the invention has been described for purposes of illustration, it is to be understood that there may be various embodiments and modifications within the general scope of the invention.

What is claimed is:

1. An automotive vehicle with rear engine drive, comprising in combination, a tub-shaped lower body having a wide intermediate passenger space portion and narrow front and rear end portions, the body being circumferentially continuous, a rigid frame secured on the top of said body, said frame extending out on the sides beyond the narrow front and rear end portions of the body to cover the front and rear wheels, said frame having a passenger opening and a rear engine opening with downturned flanges around said openings and a deep downturned flange around the outer periphery of the frame, the frame having a wide front panel providing a hood-cowl cover for the narrow front end portion of the body, longitudinal side panels along the sides of the body opening, a rear end panel, wide rear side panels along the sides of the rear engine opening, and a transverse intermediate panel between the body opening and said rear engine opening, and a body bulkhead panel closing the body space between the passenger opening and the rear engine opening.

2. An automotive vehicle as set forth in claim 1, which further comprises in combination, transverse form-fitting rib reinforcing means at the front wheel anchorage zone of the narrow front end portion of the body, the rib reinforcing means being secured at the ends to the under side of said frame.

3. An automotive vehicle as set forth in claim 1, which further comprises in combination, a transverse reinforcing member secured to said frame at the rear of its front panel to support a windshield.

4. An automotive vehicle as set forth in claim 1, which further comprises in combination, a box reinforcing structure covering said rear engine opening and the rear end and side panels of said frame.

5. An automotive vehicle as set forth in claim 4, in which said rear box reinforcing structure comprises integrated box units at each side of said rear engine opening, and a central cover removably secured between said box units.

6. An automotive vehicle as set forth in claim 1, which further comprises in combination, reinforcing box units secured to said rear side panels above the vertical support points of the rear wheels of the vehicle.

7. An automotive vehicle as set forth in claim 1, which further comprises in combination, transverse form-fitting reinforcing means on the front end portion of the body at the front wheel anchorage zone, a transverse reinforcing member secured to the rear edge of said front frame panel to support a windshield, and reinforcing elements secured on said rear side panels at the rear wheel supporting zone.

8. An automotive vehicle as set forth in claim 7, in which said rear reinforcing elements comprise box structures secured to said rear side frame panels and extending inward to cover part of the width of said rear engine opening.

9. An automotive vehicle as set forth in claim 8, which further comprises a cover removably secured over said rear engine opening between said side box structures to provide a transverse box-like reinforcement across the rear end of the frame.

10. An automotive vehicle with rear engine drive, comprising in combination, a tub-shaped body proper having narrow front and rear end portions providing side space for front and rear wheels, said body having circumferentially continuous side walls, a strong circumferentially continuous rigidifying frame secured around the top margin of said body, said frame projecting outward from the sides of said body and at the front and rear projecting sufficiently to cover said front and rear wheels, said frame having a large passenger opening and a rear engine opening, transverse reinforcing means for said body-frame assembly at the front wheel zone, and transverse reinforcing means for said body-frame assembly at the rear wheel and engine zone.

11. An automotive vehicle as set forth in claim 10, in which said frame has a very wide front panel forming with the front end of the body a box-like hood-cowl structure to accommodate the feet and legs of the driver.

12. An automotive vehicle as set forth in claim 11, which further comprises a transverse reinforcing element secured across the rear end of said wide front panel of the frame to form a windshield mounting and further rigidify said hood-cowl structure.

13. An automotive vehicle as set forth in claim 10, in which said front reinforcing means comprises a rib-like transverse reinforcement beneath the body and frame at the front wheel anchorage.

14. An automotive vehicle as set forth in claim 10, in which said rear reinforcing means comprises a box-like transverse structure secured across the top of said frame over said rear engine opening.

15. An automotive vehicle as set forth in claim 14, in which said box-like structure comprises a box on each side permanently secured to the sides of the frame at the rear wheel anchorages and a central cover removably secured between said boxes.

References Cited
UNITED STATES PATENTS

| | | | |
|---|---|---|---|
| 875,210 | 12/1907 | Ravaillier | 115—1 |
| 2,350,037 | 5/1944 | Hofheins et al. | 115—1 |
| 2,397,791 | 4/1946 | Kramer et al. | 115—1 |
| 2,923,268 | 2/1960 | Fletcher et al. | 180—54 X |
| 3,276,532 | 10/1966 | Yonkers | 180—54 |

BENJAMIN HERSH, *Primary Examiner.*

M. L. SMITH, *Assistant Examiner.*